United States Patent
Shiroki et al.

(10) Patent No.: US 8,758,940 B2
(45) Date of Patent: Jun. 24, 2014

(54) LITHIUM-TITANIUM COMPLEX OXIDE, AND BATTERY ELECTRODE AND LITHIUM ION SECONDARY BATTERY USING SAME

(71) Applicant: Taiyo Yuden Co., LTD., Tokyo (JP)

(72) Inventors: Keiko Shiroki, Takasaki (JP); Chie Kawamura, Takasaki (JP); Daigo Ito, Takasaki (JP); Akitoshi Wagawa, Takasaki (JP); Masaki Mochigi, Takasaki (JP); Toshimasa Suzuki, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 16 days.

(21) Appl. No.: 13/688,046

(22) Filed: Nov. 28, 2012

(65) Prior Publication Data
US 2013/0260251 A1     Oct. 3, 2013

(30) Foreign Application Priority Data

Mar. 29, 2012   (JP) .................................. 2012-077983

(51) Int. Cl.
    *H01M 4/485*     (2010.01)
(52) U.S. Cl.
    CPC .............. *H01M 4/485* (2013.01); *Y02E 60/122* (2013.01)
    USPC ..................................... 429/231.1; 429/231.5
(58) Field of Classification Search
    None
    See application file for complete search history.

(56) References Cited

U.S. PATENT DOCUMENTS

| | | |
|---|---|---|
| 2007/0009798 A1 | 1/2007 | Inagaki et al. |
| 2009/0155689 A1* | 6/2009 | Zaghib et al. ................. 429/221 |
| 2011/0262811 A1* | 10/2011 | Kinoshita et al. ............ 429/217 |
| 2012/0009460 A1 | 1/2012 | Inagaki et al. |
| 2012/0202113 A1* | 8/2012 | Hodge et al. ................. 429/211 |
| 2013/0029228 A1 | 1/2013 | Inagaki et al. |
| 2013/0108929 A1 | 5/2013 | Ito et al. |

FOREIGN PATENT DOCUMENTS

| | | |
|---|---|---|
| JP | 2002-289194 A | 10/2002 |
| JP | 2004311292 A * | 11/2004 |
| JP | 2007-018883 A | 1/2007 |
| JP | 3894614 B | 3/2007 |
| JP | 4153192 B | 9/2008 |
| JP | 2013-091584 A | 5/2013 |

* cited by examiner

*Primary Examiner* — Patrick Ryan
*Assistant Examiner* — Haixia Zhang
(74) *Attorney, Agent, or Firm* — Law Office of Katsuhiro Arai

(57) ABSTRACT

A lithium-titanium complex oxide containing $Li_4Ti_5O_{12}$ is characterized in that, based on SEM observation, the number-based percentage of particles whose size is less than 0.1 μm is 5 to 15% or 40 to 65%, the number-based percentage of particles whose size is 0.3 to 1.5 μm is 15 to 30%, the specific surface area measured by the BET method is 5.8 to 10.1 $m^2/g$, and the average particle size D50 according to the particle size distribution measured by laser diffraction measurement is preferably 0.6 to 1.5 μm.

8 Claims, 1 Drawing Sheet

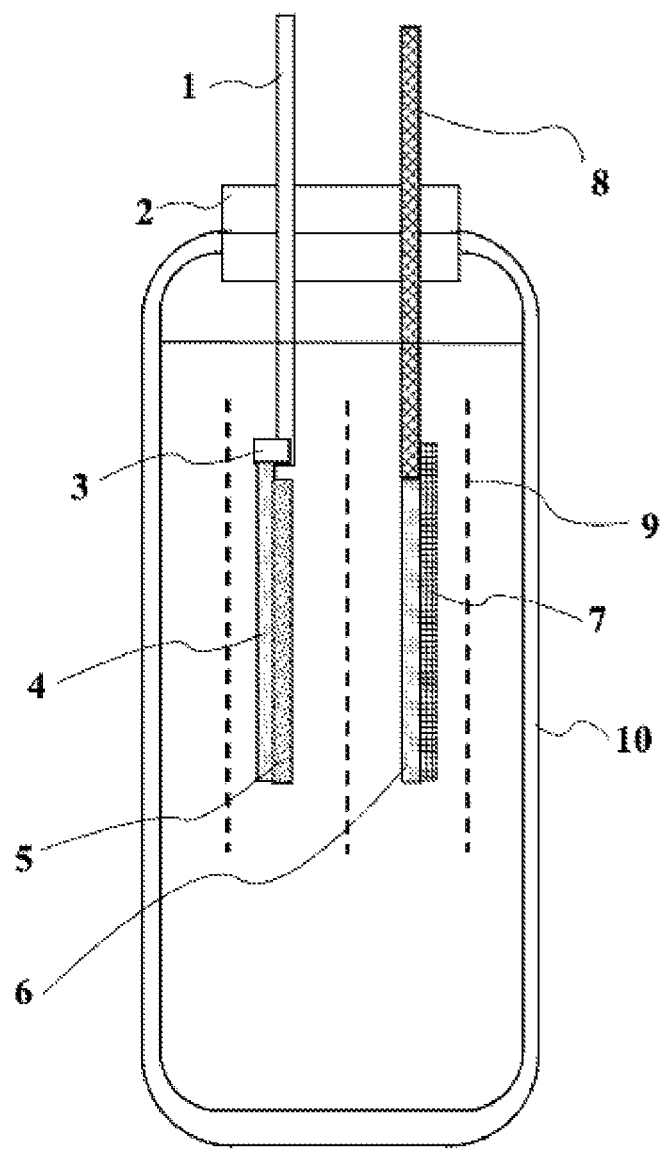

LITHIUM-TITANIUM COMPLEX OXIDE, AND BATTERY ELECTRODE AND LITHIUM ION SECONDARY BATTERY USING SAME

BACKGROUND

1. Field of the Invention

The present invention relates to a lithium-titanium complex oxide suitable as an electrode material for lithium ion secondary battery, as well as a manufacturing method thereof.

2. Description of the Related Art

Development of lithium ion secondary batteries as high-capacity energy devices has been active in recent years, and lithium ion secondary batteries are beginning to be utilized in consumer equipment, industrial machinery, automobiles and various other fields. Characteristics required of lithium ion secondary batteries include high energy density, high power density and other characteristics that support high capacity and allow for quick charge/discharge. On the other hand, incidents of fire involving a lithium ion secondary battery have been reported and the market is demanding greater safety of lithium ion secondary batteries. In particular, lithium ion secondary batteries used in onboard applications, medical applications, etc., directly affect human life in case of accidents and require even greater safety. Safety is also required of materials used for lithium ion secondary batteries, where, specifically, the market is demanding materials that demonstrate stable charge/discharge behaviors and will not burst or ignite even in unforeseen accidents.

Lithium titanates are expressed, for example, by $Li_4Ti_5O_{12}$, $Li_{4/3}Ti_{5/3}O_4$ or $Li[Li_{1/6}Ti_{5/6}]_2O_4$, and have a spinel crystalline structure. The aforementioned lithium titanate changes to a rock-salt crystalline structure as lithium ions are inserted during charge, and changes back to a spinel crystalline structure again as lithium ions dissociate. Lithium titanate undergoes far less change in its lattice volume due to charge/discharge compared to carbon materials that are conventional materials for negative electrodes, and generates little heat even when shorted to the positive electrode, thereby preventing fire accidents and ensuring high safety. Lithium-titanium complex oxides whose main constituent is lithium titanate and to which trace constituents have been added as necessary, are beginning to be adopted by lithium ion secondary battery products that are designed with specific focus on safety.

Tap density of powder, which is traditionally evaluated as one general powder property required of battery materials including lithium-titanium complex oxides, is an important factor that affects handling of powder and becomes particularly useful when the sizes of primary particles constituting the powder are relatively large in a range of about 5 μm to several tens of μm or when an electrode coating film is formed directly from the granulated powder. On the other hand, powder properties of lithium ion secondary battery materials are drawing renewed attention in recent years in order to support the high-performance needs of lithium ion secondary batteries, and as part of this trend, attempts are being made to reduce the primary particle size of powder. This is an important factor that affects quick charge/discharge (rate characteristics) as the smaller the particle size, the smoother the insertion/dissociation reactions of lithium ions become and good characteristics are achieved as a result.

Methods to make the particles constituting the powder finer include the method to use the liquid phase method to make the primary particles themselves fine (build-up method) as described in Patent Literature 1, and the method to crush the primary particles after giving them a relatively rough heat treatment to make them finer (breakdown method) as described in Example 1 of Patent Literature 2. There is also a method, which is not the liquid phase method, whereby a very fine titanium compound is used as the material and mixed with a lithium compound, and then the mixture is heat-treated at low temperature to manufacture fine lithium titanate particles. Patent Literature 3 touches on the particle size distribution measured by laser diffraction and reports that the particle size distribution affects on rate characteristics.

BACKGROUND ART LITERATURES

[Patent Literature 1] Japanese Patent No. 3894614
[Patent Literature 2] Japanese Patent Laid-open No. 2002-289194
[Patent Literature 3] Japanese Patent No. 4153192

SUMMARY

Patent Literatures 1 and 2 each describe a powder design that allows for easy handling in a specific application, but neither discloses a clear powder design method for effectively handling fine particles. Patent Literature 3 stops at disclosing the particle size distribution in the forms of average size and distribution band of secondary particles, but this information alone does not clearly reveal the average size and distribution band of primary particles. There is no mention of properties of coating solution and coating film, either. Here, it should be noted that the primary particle size and secondary particle size are differentiated. Furthermore, the primary particle size distribution and secondary particle size distribution can each be an equally important factor. The primary particle refers to the smallest unit of particle constituting the powder, while the secondary particle refers to an aggregate formed by a group of primary particles.

If the particle size is too small, the ease of handling is affected; for example, dispersion becomes difficult when preparing an electrode coating solution or the like. If an electrode coating film is formed from fine particles, the electrode density cannot be raised unlike when it is formed from large particles as has been done traditionally. This is because, when an electrode coating solution is prepared, fine particles do not disperse stably in the dispersion medium and end up forming a three-dimensional cross-linked structure. When large particles are used, the tap filling property of the powder is somewhat correlated with the density of the coating film, but when fine particles are used, the wettability on the particle surface and affinity with the dispersion medium tend to drop in the coating solution, and cohesion and formation of cross-linked structure occur easily as a result, which is different from the tap filling property exhibited by the powder. If an electrode coating film is formed using the above coating solution, the coating film density drops and consequently the energy density of the resulting lithium ion secondary battery becomes lower and other problems may also occur such as drop in reliability due to separation of the film.

Specific surface area has significant bearing on gas generation. This is probably because the higher the specific surface area, or more active the surface of the fine particle, the more easily $CO_2$ and water adsorb to the particle. As $CO_2$ and water adsorb to the particle, hydroxides and carbonates tend to generate on the surface, and the pH value tends to become higher. These can cause dispersion instability in the dispersion medium when an electrode coating solution is prepared. Accordingly, it is important to produce a powder whose powder characteristics (particle size distribution) are such that desired rate characteristics manifest easily while easy handling is ensured. No prior art presents a powder design that ensures dispersion stability of electrode coating solution, ease of handling, optimal electrode coating film density, and optimal battery characteristics such as rate characteristics.

In consideration of the above, the object of the present invention is to provide a lithium titanate that can be manufactured by the solid phase method associated with low manufacturing cost, and which exhibits high effective capacity and high rate characteristics.

Any discussion of problems and solutions involved in the related art has been included in this disclosure solely for the purposes of providing a context for the present invention, and should not be taken as an admission that any or all of the discussion were known at the time the invention was made.

After studying in earnest, the inventors completed the following invention:

The lithium-titanium complex oxide proposed by the present invention contains $Li_4Ti_5O_{12}$. Based on SEM observation, (1) the number-based percentage of particles whose size is less than 0.1 μm is 5 to 15% or 40 to 65%, (2) the number-based percentage of particles whose size is 0.3 to 1.5 μm is 15 to 30%, and (3) the specific surface area measured by the BET method is 5.8 to 10.1 $m^2/g$. In addition, (4) the average particle size D50 according to the particle size distribution measured by laser diffraction measurement is preferably 0.6 to 1.5 μm, or more preferably 0.6 to 0.8 μm.

According to the present invention, a battery electrode using the aforementioned lithium-titanium complex oxide is also provided, as well as a lithium ion secondary battery having such electrode.

According to the present invention, particles whose size is less than 0.1 μm fill gaps between larger particles when a film is formed, which increases the film density and allows a dense film to be formed. It also allows for a smooth electrode sheet to be formed which is less vulnerable to electrode film separation. Also, the $CO_2$ generation amount is small. According to the present invention, a lithium-ion secondary battery offering good rate characteristics can be obtained. Even when the sintering temperature varies, the primary particle size distribution can be controlled by means of crushing and heat treatment. A desired powder can be produced using low-cost materials because, since the design of the powder is based on crushing of coarse particles, its characteristics are not affected by the materials. The particle size can be controlled only by means of crushing to achieve a specified primary particle size distribution, which allows for cost-effective powder design process.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawing of a preferred embodiment which is intended to illustrate and not to limit the invention. The drawing is greatly simplified for illustrative purposes and is not necessarily to scale.

The FIGURE is a schematic section view of a half cell.

DESCRIPTION OF THE SYMBOLS

1, 8 Al lead
2 Thermo-compression bonding tape
3 Kapton tape
4 Aluminum foil
5, 15, 16 Electrode mixture
6 Metal Li plate
7 Ni mesh
9 Separator
10 Aluminum laminate cell

DETAILED DESCRIPTION OF EMBODIMENTS

According to the present invention, a ceramic material whose main constituent is a lithium titanate having a spinel structure expressed by $Li_4Ti_5O_{12}$ and to which trace constituents have been added as necessary is provided, and this ceramic material contains the aforementioned lithium titanate typically by 90% or more, or preferably 95% or more. In this Specification, this ceramic material is sometimes referred to as "lithium-titanium complex oxide." According to the present invention, the lithium-titanium complex oxide is in a powder form as an aggregate of particles whose shape (particle size distribution, etc.) is explained in detail below. According to the present invention, the lithium-titanium complex oxide can contain elements other than titanium, lithium and oxygen, where examples of the elements that can be contained include potassium, phosphorous, niobium, sulfur, silicon, zirconium, calcium and sodium, etc. Preferably these constituents are virtually all dissolved in the ceramic structure of lithium titanate as oxides.

As a factor that affects battery characteristics, the inventors of the present invention found the importance of primary particles of certain sizes being present at certain percentages. According to the present invention, (1) the number-based percentage of particles whose size is less than 0.1 μm is 5 to 15% or 40 to 65%, (2) the number-based percentage of particles whose size is 0.3 to 1.5 μm is 15 to 30%, and (3) the specific surface area measured by the BET method is 5.8 to 10.1 $m^2/g$.

(1) to (3) above are calculated by SEM observation. To be specific, 0.025 g of the target powder of lithium-titanium complex oxide is dispersed in 50 cc of dispersion medium (ethanol). Dispersion is continued for 20 minutes using a supersonic homogenizer. The obtained dispersion liquid is applied to an Al substrate of 1.5 cm×1.5 cm using a spin coater operated at 2000 rpm. A secondary micrograph is captured at an acceleration voltage of 5 to 15 kV and magnification of 10000 to 40000, using SEM such as the high-resolution, field-emission type scanning electron microscope S-4800 by Hitachi or the like. Each particle size is obtained from this micrograph as a feret diameter. Here, at least 300 particles are observed, and if not enough particles are available, the observation area is widened.

Particles are classified as follows according to the particle size measured as above:

Particles whose size is less than 0.1 μm are called "chipping particles."

Particles whose size is 0.1 to 0.3 μm (not including 0.3 μm) are called "intermediate particles."

Particles whose size is 0.3 to 1.5 μm are called "large particles."

According to the present invention, (1) the number-based percentage of chipping particles is 5 to 15% or 40 to 65%. If this percentage is too high, density does not improve when a coating film is formed. If the percentage is too low, the formed coating film separates easily. Surprisingly, drop in coating film density and tendency of coating film separation were observed at a percentage of approx. 38% (refer to the comparative examples explained later). The degree of crushing can be increased to raise the number-based percentage of chipping particles, where specific methods include increasing the grinding process time.

According to the present invention, (2) the number-based percentage of large particles is 15 to 30%. If this percentage is too high, density does not improve when a coating film is formed. If the percentage is too low, the formed coating film separates easily. The number-based percentage of large particles can be increased by shortening the crushing time in an impact crusher (pin mill, atomizer crusher, bead mill, etc.).

Also according to the present invention, (3) the specific surface area measured by the BET (Brunauer-Emmett-Teller) method is preferably 5.8 to 10.1 $m^2/g$. The value of specific surface area can be measured using the FlowSorb II-2300 by Shimadzu, etc, for example. One reason explaining the presence of particles of large specific surface areas value, or specifically very fine particles, is excessive crushing of primary particles in the lithium-titanium complex oxide when the lithium-titanium complex oxide is crushed after synthesis. Although the specific condition varies depending on the heat treatment temperature and materials, the synthesized lithium-titanium complex oxide is sometimes strongly cohered due to heat treatment, and it is important to release this cohesion in the crushing process in order to achieve ease of handling when forming a battery electrode.

If this value of specific surface area is too small, the capacity of the formed secondary battery becomes low and its rate characteristics also decrease. If the specific surface area is too large, on the other hand, the formed coating film becomes unsmooth and separates easily.

In a favorable embodiment, (4) the average secondary particle size (D50) is preferably 0.6 to 1.5 μm, or more preferably 0.6 to 0.8 μm. The D50 is the simplest measure of evaluation to understand the basic fineness of a particle. A D50 within the above ranges results in improved rate characteristics.

Methods to increase D50 include growing the particles by raising the temperature of the heat treatment given to synthesize the lithium-titanium complex oxide (primarily increasing the primary particle size), or adding a cohesion operation after heat-treating and synthesizing the lithium-titanium complex oxide (primarily increasing the secondary particle size), etc, while methods to decrease D50 include suppressing the particle growth by lowering the temperature of the heat treatment at the time of synthesis (primarily decreasing the primary particle size), or adding a crushing operation after heat-treating and synthesizing the lithium-titanium complex oxide (primarily decreasing the secondary particle size), etc.

The method to manufacture the lithium-titanium complex oxide proposed by the present invention is not specifically limited, and the favorable example given below is only an example. The lithium-titanium complex oxide is generally manufactured through a step to mix the materials uniformly, a step to heat-treat the obtained mixture, and step to crush the lithium-titanium complex oxide obtained by heat treatment if it is coarse.

Under the solid phase method, lithium-titanium complex oxide is typically obtained by mixing and sintering a titanium compound, lithium compound, and trace constituents, as necessary.

For the lithium source, a lithium salt or lithium hydroxide is typically used. Examples of the lithium salt include a carbonate and acetate, etc. As a hydroxide, a hydrate such as monohydrate or the like may be used. For the lithium source, two or more of the foregoing may be combined. As other lithium materials, lithium compounds that are generally readily available can be used as deemed appropriate. If the presence of residues of substances originating from the lithium compound is not acceptable in the heat treatment process, it is safe to avoid lithium compounds containing elements other than C, H and O. For the titanium source, a titanium dioxide or hydrous titanium oxide can be applied. A lithium compound is mixed with a titanium compound by the wet method or dry method so that the mol ratio of Li and Ti preferably becomes 4:5. It should be noted that, since lithium may decrease as a result of partial volatilization, loss due to sticking to equipment walls, or for other reasons in the manufacturing process, a greater amount of source lithium than the final target amount of Li may be used.

Wet mixing is a method whereby dispersion medium such as water, ethanol or the like is used together with a ball mill, planetary ball mill, bead mill, wet jet mill, etc. Dry mixing is a method whereby no dispersion medium is used and a ball mill, planetary ball mill, bead mill, jet mill or flow-type mixer, or machine capable of applying compressive force or shearing force to achieve precision mixing or efficiently add mechano-chemical effect such as Nobilta (Hosokawa Micron), Miralo (Nara Machinery), or the like is used. One example of preferred dry mixing conditions is as follows. Preferred dispersion mode is ball mill dispersion, preferably using 5 to 10 parts by weight of beads relative to one part by weight of the material powder. The ball mill processing time is preferably 10 to 40 hours. Beads used are preferably Zr beads. The bead diameter is preferably 1 to 20 mm, or more preferably 5 to 10 mm.

The mixed materials are heat-treated in atmosphere, dry air, nitrogen, argon or other atmosphere at 700° C. or above, or preferably at 750 to 950° C., to obtain a lithium-titanium complex oxide. The specific heat treatment temperature changes as deemed appropriate according to the particle sizes and mixing level of materials as well as the target particle size of the lithium-titanium complex oxide.

The product of heat treatment is preferably put through at least one treatment from among pin milling, grinding process, classification, and reheat treatment.

Preferably bead milling is performed for approx. 10 to 60 minutes as a pre-treatment before pin milling. Thereafter, pin milling is performed under the condition of preferably 5000 to 10000 rpm and preferably by 1 to 3 passes, or more preferably by 1.5 to 2.5 passes, for example. Grinding process can be performed for 1 to 50 hours, or preferably 5 to 50 hours, for example. An example of classification is one using a dry classifier that utilizes a classification rotor.

Reheat treatment can be performed at approx. 300 to 700° C., lower than the heat treatment temperatures used for synthesizing the lithium-titanium complex oxide, for preferably 1 to 10 hours, or more preferably 1 to 5 hours, for example. In reheat treatment, partial particle necking may occur to achieve fine control of particle size.

The aforementioned powder treatment method is only an example and those skilled in the art should be able to name other specific treatment methods, as appropriate, for obtaining a lithium-titanium complex oxide having a desired particle size distribution, by referring to the foregoing and examples described below, and lithium-titanium complex oxides obtained by these other means are also included in the scope of the present invention.

Although the solid phase method discussed above is advantageous in terms of cost among the manufacturing methods for lithium-titanium complex oxide, the sol-gel method or wet method using alkoxide, etc. can also be adopted.

The lithium-titanium complex oxide proposed by the present invention can be used favorably as an active electrode material for lithium ion secondary batteries. It can be used for positive electrodes and negative electrodes. The configurations and manufacturing methods of electrodes containing the lithium-titanium complex oxide as their active material and lithium ion secondary battery having such electrodes can apply any prior technology as deemed appropriate. Also, in the examples explained later, an example of manufacturing a lithium ion secondary battery is presented. Typically a suspension containing the lithium-titanium complex oxide as an active material, conductive auxiliary, binder, and an appropriate solvent is prepared and this suspension is applied to the metal piece, etc., and dried, and then pressed to form an electrode.

For the conductive auxiliary, metal powder such as carbon material, aluminum powder or the like, or conductive ceramics such as TiO or the like, can be used. Examples of the carbon material include acetylene black, carbon black, coke, carbon fiber, and graphite.

Examples of the binder include various resins, or more specifically fluororesins, etc., for example, polytetrafluoroethylene (PTFE), polyvinylidene difluoride (PVdF), fluororubber, styrene butadiene rubber, and the like. Preferably the blending ratio of negative electrode active material, conductive agent, and binder is 80 to 98 percent by mass of negative electrode active material, 0 to 20 percent by mass of conductive agent, and 2 to 7 percent by mass of binder. The collector is preferably an aluminum foil or aluminum alloy foil of 20 μm or less in thickness.

When the lithium-titanium complex oxide is used as a negative electrode active material, the material used for the positive electrode is not specifically limited and any known material can be used, where examples include lithium-manganese complex oxide, lithium-nickel complex oxide, lithium-cobalt complex oxide, lithium-nickel-cobalt complex oxide, lithium-manganese-nickel complex oxide, spinel lithium-manganese-nickel complex oxide, lithium-manganese-cobalt complex oxide, and lithium iron phosphate, etc.

For the conductive agent, binder, and collector for the positive electrode, those mentioned above can be used. Preferably the blending ratio of positive electrode active material, conductive agent, and binder is 80 to 95 percent by mass of positive electrode active material, 3 to 20 percent by mass of conductive agent, and 2 to 7 percent by mass of binder.

From the positive/negative electrodes thus obtained, electrolyte solution constituted by lithium salt and organic solvent or organic solid electrolyte or inorganic solid electrolyte, separator, etc., a lithium ion secondary battery can be constituted. Examples of the lithium salt include lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluorometanesulfonate ($LiCF_3SO_3$), lithium bis-trifluoromethyl sulfonyl imide $[LiN(CF_3SO_2)_2]$, and the like. One type of lithium salt may be used, or two or more types may be combined. Examples of the organic solvent include propylene carbonate (PC), ethylene carbonate (EC), vinylene carbonate and other cyclic carbonates; diethyl carbonate (DEC), dimethyl carbonate (DMC), methyl ethyl carbonate (MEC) and other chained carbonates; tetrahydrofuran (THF), 2-methyl tetrahydrofuran (2MeTHF), dioxolane (DOX) and other cyclic ethers; dimethoxy ethane (DME), dietoethan (DEE) and other chained ethers; γ-butyrolactone (GBL); acetonitrile (AN); and sulfolane (SL), etc., either used alone or combined into a mixed solvent.

For the organic solid electrolyte, for example, polyethylene derivative, polyethylene oxide derivative or polymer compound containing it, or polypropylene oxide derivative or polymer compound containing it, is suitable. Among the inorganic solid electrolytes, Li nitride, halogenated Li, and Li oxyate are well-known. In particular, $Li_4SiO_4$, $Li_4SiO_4$—LiI—LiOH, $xLi_3PO_4$-(1-x) $Li_4SiO_4$, $Li_2SiS_3$, $Li_3PO_4$—$Li_2S$—$SiS_2$, phosphorus sulfide compound, etc., are effective. For the separator, a polyethylene microporous membrane is used. The separator is installed between the two electrodes in a manner not allowing the positive electrode and negative electrode to contact each other.

EXAMPLES

The present invention is explained more specifically using examples below. It should be noted, however, that the present invention is not limited to the embodiments described in these examples. First, how the samples obtained by the examples/comparative examples were analyzed and evaluated is explained.

(How to Measure D50)

D50 is a particle size indicator based on cumulative frequency by laser diffraction measurement of particle size distribution. D50 represents the particle size when the cumulative frequency as counted from the smallest particle size reaches 50%, while D100 represents the particle size when the cumulative frequency reaches 100%. The Microtrack HRA9320-X100 by Nikkiso was used as a measurement apparatus, ethanol was used as a dispersion medium, and samples were dispersed by supersonic waves for 20 minutes using a supersonic homogenizer as a pretreatment.

The aforementioned method was used to derive the primary particle size and BET size using SEM observation images.

(How to Measure $CO_2$ Discharge)

The reheat-treated powder was quantified by thermal decomposition gas chromatography mass spectrometry (GC-MS) and also heated to 900° C. to measure the generated amount of $CO_2$ as detected as m/z=44.

(Battery Evaluation—Half Cell)

The FIGURE is a schematic section view of a half cell. An electrode mixture was prepared by using lithium-titanium complex oxide as an active material. Ninety parts by weight of the obtained lithium-titanium complex oxide as an active material, 5 parts by weight of acetylene black as a conductive auxiliary, and 5 parts by weight of polyvinylidene difluoride (PVdF) as a binder, were mixed using n-methyl-2-pyrrolidone (NMP) as a solvent. The materials were mixed using a high-shear mixer until a stable viscosity was obtained. The amount of NMP was adjusted so the viscosity of the mixed coating solution fell under a range of 500 to 1000 mPa·sec at 100 $s^{-1}$. This electrode mixture 5 was applied to an aluminum foil 4 to a coating weight of 3 mg/cm² using the doctor blade method. The coated foil was vacuum-dried at 130° C., and then roll-pressed. The corresponding coating film density was calculated from the film thickness and coating weight, and recorded. The coating film was subjected to a peel test using a commercially available clear adhesive tape, with the test repeated five times at one location and the result regarding whether there was any peel or not was recorded. Furthermore, the coating film was also visually observed for smoothness and the results were classified into ◎ (no visible surface irregularity or irregular surface pattern), ○ (neither ◎ nor X) and X (3 or more surface irregularities or irregular surface patterns per 100 mm$^2$), and recorded. An area of 10 cm$^2$ was stamped out from the coating film to obtain a positive electrode. For the negative electrode, a metal Li plate 6 attached to a Ni mesh 7 was used. For the electrolyte solution, ethylene carbonate and diethyl carbonate were mixed at a volume ratio of 1:2, and then 1 mol/L of LiPF$_6$ was dissolved into the obtained solvent. For a separator 9, a porous cellulose membrane was used. Also, as illustrated, Al leads 1, 8 were fixed using a thermo-compression bonding tape 2, and the Al lead 1 was fixed to the working electrode using a Kapton tape 3. An aluminum laminate cell 10 was thus prepared. This battery was used to measure the initial discharge capacity. The battery was charged to 1.0 V at a constant current of 0.105 mA/cm$^2$ (0.2 C) in current density, and then discharged to 3.0 V, with the cycle repeated three times and the discharge capacity in the third cycle used as the value of initial discharge capacity. Next, the rate characteristics were measured. Measurement was performed by increasing the charge/discharge rate in steps from 0.2 C to 1 C, 2 C, 3 C, 5 C and 10 C. The ratio of the discharge capacity at the 10-C rate in the second cycle, to the 0.2-C discharge capacity, was recorded as rate characteristics (%).

Example 1

Into a 5-L pot, 728 g of a highly pure Anatase-type titanium dioxide of 10 m$^2$/g in specific surface area value (primary particle size of approx. 0.15 um) and 272 g of a reagent-grade lithium carbonate of 25 μm in average particle size were introduced and sealed together with 7 kg of zirconium beads of 5 mm in diameter, after which the mixture was agitated for 24 hours at 100 rpm and then separated from the beads to obtain a mixed powder. The mixed powder was filled in a saggar and heat-treated in a continuous sintering furnace in atmosphere under a profile of maintaining the maximum temperature of 870° C. for 3 hours. Next, 700 g of this heat-treated powder was introduced to a batch bead mill filled with zirconium beads of 10 mm in diameter and crushed for 25 minutes, after which the crushed powder was passed twice through a pin mill of 250 mm in disk diameter operating at 7000 rpm. Thereafter, the powder was put through a grinding process for 48 hours using an automatic grinder. This was followed by classification using a dry classifier with a classification rotor of 320 mm in rotor diameter, operated at 1500 rpm, after which the powder passing through the classification rotor was collected.

The obtained powder was filled in a saggar and heat-treated again in a continuous sintering furnace in atmosphere under a profile of maintaining the maximum temperature of 590° C. for 3 hours, to obtain a lithium-titanium complex oxide.

Examples 2 to 10, Comparative Examples 1 to 6

A lithium-titanium complex oxide was produced in the same method described in Example 1, except that the diameter of zirconium beads introduced to the 5-L pot together with the high-purity titanium dioxide and lithium carbonate, number of passes through the pin mill, grinding process time in the automatic grinder, and maximum temperature of reheat treatment after the classification rotor operation, were adjusted as shown in Table 1.

Table 1 summarizes the manufacturing conditions used in the examples and comparative examples, while Table 2 summarizes the evaluation results.

TABLE 1

| | Chipping particles | Intermediate particles | Large particles | BET specific surface area (m$^2$/g) | D50 (μm) | Zr bead diameter (mm) | Number of passes through pin mill | Grinding process time (hr) | Maximum temperature of reheat treatment |
|---|---|---|---|---|---|---|---|---|---|
| Example 1 | 62% | 18% | 20% | 10.1 | 0.73 | 5 | 2 passes | 48 | 590° C. |
| Example 2 | 65% | 5% | 30% | 9.4 | 0.68 | No bead | 1.5 passes | 48 | 590° C. |
| Example 3 | 41% | 44% | 15% | 8.5 | 0.79 | 5 | 2.5 passes | 24 | 590° C. |
| Example 4 | 43% | 30% | 27% | 7.9 | 0.83 | 5 | 1.5 passes | 24 | 590° C. |
| Example 5 | 5% | 65% | 30% | 5.8 | 1.32 | 10 | 1.5 passes | 5 | 590° C. |
| Example 6 | 5% | 80% | 15% | 6.2 | 1.21 | 10 | 2.5 passes | 5 | 590° C. |
| Example 7 | 15% | 55% | 30% | 6.9 | 0.98 | 10 | 1.5 passes | 10 | 590° C. |
| Example 8 | 15% | 70% | 15% | 6.4 | 1.01 | 10 | 2.5 passes | 10 | 590° C. |
| Example 9 | 48% | 32% | 20% | 8.6 | 0.82 | 5 | 2 passes | 30 | 400° C. |
| Example 10 | 53% | 26% | 21% | 8.8 | 0.71 | 5 | 2 passes | 30 | 620° C. |
| Comparative Example 1 | 88% | 27% | 35% | 7 | 0.81 | 5 | 0 pass | 20 | 590° C. |
| Comparative Example 2 | 88% | 45% | 17% | 8 | 0.95 | 5 | 2.5 passes | 20 | 590° C. |
| Comparative Example 3 | 38% | 50% | 12% | 8.5 | 0.98 | 10 | 3 passes | 20 | 590° C. |
| Comparative Example 4 | 66% | 18% | 16% | 11 | 0.69 | 5 | 2.5 passes | 55 | 590° C. |
| Comparative Example 5 | 70% | 21% | 9% | 12 | 0.56 | 5 | 2 passes | 70 | 590° C. |
| Comparative Example 6 | 3% | 88% | 9% | 5.5 | 1.18 | 5 | 2 passes | None | 590° C. |

TABLE 2

| | Capacity (mAh/g) | Rate characteristics (%) | Density (g/cm$^3$) | Gas generation (ppm by weight) | Film separation | Smoothness |
|---|---|---|---|---|---|---|
| Example 1 | 168 | 63 | 1.9 | 900 | Did not occur. | ◎ |
| Example 2 | 165.2 | 64.5 | 1.6 | 850 | Did not occur. | ◎ |
| Example 3 | 164.9 | 63.6 | 1.5 | 875 | Did not occur. | ○ |
| Example 4 | 163.4 | 63.2 | 1.5 | 842 | Did not occur. | ○ |
| Example 5 | 159.3 | 61 | 1.3 | 770 | Did not occur. | ○ |
| Example 6 | 160.4 | 63.8 | 1.2 | 786 | Did not occur. | ○ |
| Example 7 | 162.5 | 62.5 | 1.4 | 817 | Did not occur. | ○ |
| Example 8 | 163.2 | 62.9 | 1.3 | 830 | Did not occur. | ○ |
| Example 9 | 161.2 | 65.2 | 1.8 | 1020 | Did not occur. | ○ |
| Example 10 | 166.9 | 64.5 | 1.9 | 890 | Did not occur. | ◎ |
| Comparative Example 1 | 155 | 45 | 1.1 | 900 | Did not occur. | X |
| Comparative Example 2 | 161 | 60 | 1.2 | 1000 | Occurred. | ○ |
| Comparative Example 3 | 162 | 60 | 1.2 | 990 | Occurred. | ○ |
| Comparative Example 4 | 158 | 62 | 1.1 | 2100 | Occurred. | X |
| Comparative Example 5 | 159 | 63 | 1.0 | 2300 | Occurred. | X |
| Comparative Example 6 | 162 | 62 | 1.1 | 1200 | Occurred. | ○ |

The above results show that a lithium ion secondary battery containing the lithium-titanium complex oxide proposed by the present invention as an electrode active material offers high initial discharge capacity, excellent rate characteristics, and smooth electrodes.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-077983, filed Mar. 29, 2012, the disclosure of which, including the claims, is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A lithium-titanium complex oxide containing $Li_4Ti_5O_{12}$, wherein, based on scanning electron microscope (SEM) observation, a number-based percentage of all particles whose size is less than 0.1 μm is 5 to 15% or 40 to 65% of the total particles, a number-based percentage of all particles whose size is 0.3 to 1.5 μm is 15 to 30% of the total particles, and a specific surface area measured by the Brunauer-Emmett-Teller (BET) method is 5.8 to 10.1 m$^2$/g.

2. A lithium-titanium complex oxide according to claim 1, wherein an average particle size D50 according to a particle size distribution measured by laser diffraction measurement is 0.6 to 1.5 μm.

3. A positive electrode for a battery containing the lithium-titanium complex oxide according to claim 1 as a positive electrode active material.

4. A positive electrode for a battery containing the lithium-titanium complex oxide according to claim 2 as a positive electrode active material.

5. A negative electrode for a battery containing the lithium-titanium complex oxide according to claim 1 as a negative electrode active material.

6. A negative electrode for a battery containing the lithium-titanium complex oxide according to claim 2 as a negative electrode active material.

7. A lithium ion secondary battery having a positive electrode containing the lithium-titanium complex oxide according to claim 1, or a negative electrode containing the lithium-titanium complex oxide according to claim 1.

8. A lithium-titanium complex oxide according to claim 1, wherein the particles whose size is less than 0.1 μm, the particles whose size is 0.3 to 1.5 μm, and particles whose size is no less than 0.1 μm but less than 0.3 μm account for 100% of the particles.

* * * * *